United States Patent
Pereira Da Silva et al.

(10) Patent No.: US 10,356,556 B2
(45) Date of Patent: Jul. 16, 2019

(54) METHOD FOR LOCATING MOBILE DEVICES IN A COMMON FRAME OF REFERENCE

(71) Applicant: COMMISSARIAT À L'ÉNERGIE ATOMIQUE ET AUX ÉNERGIES ALTERNATIVES, Paris (FR)

(72) Inventors: Alex Pereira Da Silva, Saint Martin d'Heres (FR); Sylvain Leirens, Pierre Chatel (FR)

(73) Assignee: COMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/150,555

(22) Filed: Oct. 3, 2018

(65) Prior Publication Data

US 2019/0110162 A1    Apr. 11, 2019

(30) Foreign Application Priority Data

Oct. 6, 2017 (FR) .................................... 17 59405

(51) Int. Cl.
*H04W 24/00* (2009.01)
*H04W 4/02* (2018.01)
(Continued)

(52) U.S. Cl.
CPC .......... *H04W 4/023* (2013.01); *G01C 22/006* (2013.01); *H04W 64/003* (2013.01); *H04W 4/029* (2018.02); *H04W 4/33* (2018.02)

(58) Field of Classification Search
CPC ... H04W 4/029; H04W 4/021; H04W 64/003; H04W 4/02; H04W 4/023; H04W 4/21; H04W 4/80; H04W 84/18; H04W 88/08
See application file for complete search history.

(56) References Cited

U.S. PATENT DOCUMENTS 6,580,978 B1    6/2003  McTamaney
9,560,060 B2 *  1/2017  Baxley ................ H04L 63/1416
(Continued)

FOREIGN PATENT DOCUMENTS

WO    2012/167301 A1    12/2012
WO    2013/141991 A1    9/2013
WO    2017/084468 A1    5/2017

OTHER PUBLICATIONS

Preliminary French Search Report for Application No. FR 1759405, dated Jul. 5, 2018.

*Primary Examiner* — Khalid W Shaheed
(74) *Attorney, Agent, or Firm* — Pearne & Gordon LLP

(57) ABSTRACT

In a method for locating mobile devices, a trajectory (T1, T2) is reconstructed modelling a movement made by each mobile device during which the mobile device carries out measurements of an indicator linked to the distance separating it from access terminals (B1-B5) to a communication network. From these measurements, the locations of the terminals are calculated in a frame of reference linked to each mobile device. A procrustean analysis is then performed to determine, for each mobile device, a geometric transformation that transforms the locations of the terminals in the frame of reference linked to the mobile device into locations transformed in a common frame of reference. From this determination, the location of each terminal transformed in the common frame of reference is superimposed with a location of the terminal in the common frame of reference. Finally, the corresponding geometric transformation is applied to the trajectory of each mobile device.

12 Claims, 3 Drawing Sheets

(51) Int. Cl.
    *H04W 64/00*     (2009.01)
    *G01C 22/00*     (2006.01)
    *H04W 4/33*     (2018.01)
    *H04W 4/029*     (2018.01)

(56) References Cited

U.S. PATENT DOCUMENTS

| | | | |
|---|---|---|---|
| 9,741,169 B1 * | 8/2017 | Holz | G06T 19/006 |
| 2010/0130230 A1 * | 5/2010 | Aggarwal | G01S 5/0263 |
| | | | 455/456.1 |
| 2011/0285580 A1 * | 11/2011 | Bosser | G01S 13/90 |
| | | | 342/25 F |
| 2013/0307723 A1 | 11/2013 | Garin et al. | |
| 2015/0119068 A1 * | 4/2015 | Kudekar | H04W 4/043 |
| | | | 455/456.1 |
| 2015/0219745 A1 | 8/2015 | Nakata | |
| 2016/0127931 A1 * | 5/2016 | Baxley | G06F 16/285 |
| | | | 455/67.16 |
| 2018/0075643 A1 * | 3/2018 | Sequeira | G01C 21/206 |

* cited by examiner

METHOD FOR LOCATING MOBILE DEVICES IN A COMMON FRAME OF REFERENCE

CROSS-REFERENCE TO RELATED APPLICATIONS

This application claims priority from French Patent Application No. 17 59405, filed Oct. 6, 2017. The content of this application is incorporated herein by reference in its entirety.

DESCRIPTION

Technical Field

The field of the invention is that of wireless communication networks. The invention relates to the tracking of movements made by mobile devices in an environment where they detect wireless access terminals to a communication network, such as Wi-Fi terminals, and more specifically a technique for obtaining a representation of these movements in a common frame of reference.

Prior Art

Several wireless communication devices transported by users or integrated in robots are considered. The users or the robots move about in an environment (for example in a building) where the wireless communication devices are capable of detecting access terminals to a communication network, typically Wi-Fi terminals. It is sought to track the movements made by the wireless communication devices, and more specifically to represent the locations of the mobile devices in a common frame of reference.

Existing approaches for representing the movements of users in a common frame of reference take account of prior knowledge of the absolute positions of the radio sources (see for example WO 2013/141991 A1), a mapping of the received signal strength indicator in the environment (RSSI "Received Signal Strength Indicator" map) (see for example R. Liu et al., Selective AP-sequence Based Indoor Localization without Site Survey, Vehicular Technology Conference (VTC Spring), 2016), or precise measurements of one of the movements (see for example WO 2012/167301 A1).

DESCRIPTION OF THE INVENTION

The aim of the invention is to allow such a representation of movements in a common frame of reference without requiring prior knowledge of a radio mapping of the environment or the absolute positions of the terminals and/or the mobile devices.

To this end, the invention relates to a method for locating mobile devices, including the following steps:
- for each mobile device, reconstructing a trajectory modelling a movement made by the mobile device during which the mobile device carries out measurements of an indicator linked to the distance separating it from access terminals to a communication network;
- for each mobile device, calculating, from the measurements carried out by the mobile device, the locations of the terminals in a frame of reference linked to the mobile device;
- determining, for each mobile device, a geometric transformation that transforms the locations of the terminals in the frame of reference linked to the mobile device into locations transformed in a common frame of reference, said determining being carried out so as to superimpose according to a superimposition validity metric, for each terminal, the locations of the terminal transformed in the common frame of reference with a location of the terminal in the common frame of reference;
- for each mobile device, modifying the trajectory of the mobile device by applying the corresponding geometric transformation.

Certain preferred but non-limiting aspects of this method are the following:
- the common frame of reference is one of the frames of reference linked to the mobile devices;
- the step of determining, for each mobile device, a geometric transformation is preceded by the following steps:
  - selecting a reference frame of reference among the frames of reference linked to the mobile devices;
  - determining, for each mobile device, a first geometric transformation that transforms the locations of the terminals in the frame of reference linked to the mobile device into locations transformed in the reference frame of reference, said determining being carried out so as to superimpose according to the superimposition validity metric, for each terminal, the locations of the terminal transformed in the reference frame of reference with the location of the terminal in the reference frame of reference;
  - for each terminal, determining the location of the access terminal in the common frame of reference as a function of the locations transformed in the reference frame of reference;
- for each terminal, the location of the access terminal in the common frame of reference is determined by the calculation of a weighted average or the median of the locations transformed in the reference frame of reference;
- the weighting applied to each of the locations transformed in the reference frame of reference in the calculation of the weighted average is an uncertainty concerning the corresponding location in the frame of reference linked to the mobile device;
- the modification, for each mobile device, of the trajectory of the mobile device includes a chopping of the trajectory into successive sections each constituted of a number of points identical to the number of access terminals, and the application of the corresponding geometric transformation to each of the sections;
- the reconstruction of the trajectory followed by a mobile device includes a pedestrian dead reckoning implementing a detection of steps and change of walking direction during the movement;
- the superimposition validity metric is an indicator representative of the distance, for each access terminal, between each of the locations transformed in the reference frame of reference and the location of the access terminal in the reference frame of reference;
- the determination, for each mobile device, of the geometric transformation is carried out by a procrustean analysis;
- it further includes a step of locating, in the reference frame of reference, measurements of a received signal strength indicator carried out by the mobile devices during their movements, and a step of interpolating said measurements to carry out a mapping of the received signal strength.

BRIEF DESCRIPTION OF THE DRAWINGS

Other aspects, aims, advantages and characteristics of the invention will become clearer on reading the detailed description of preferred embodiments thereof, given by way of non-limiting example, and made with reference to the appended drawings, in which.

DETAILED DESCRIPTION OF PARTICULAR EMBODIMENTS

The invention relates to a method for locating mobile devices in a common frame of reference, the mobile devices making movements during which each mobile device moves about freely in its environment while carrying out measurements of an indicator linked to the distance separating it from access terminals to a communication network.

Each mobile device is a wireless communication device transported by a user or integrated in a robot. The user or the robot makes a movement in an environment where the wireless communication device is capable of detecting one or more access terminals. In an exemplary embodiment, the mobile device is a smartphone and the access terminals are Wi-F terminals. The invention extends however to other types of devices, as well as to other types of access terminals such as Bluetooth beacons or base stations of a cellular network.

The method according to the invention includes a step, implemented for each mobile device, of reconstructing a trajectory modelling a movement made by the mobile device. This reconstruction implements an odometry algorithm exploiting measurements carried out by one or more sensors embedded within the mobile device. The reconstruction may be carried out within the mobile device, and the data of the reconstruction may be collected by a server. Alternatively, the measurements are directly transmitted to the server, which carries out the reconstruction of the trajectory.

In one possible embodiment, the odometry algorithm is a pedestrian dead reckoning (PDR) implementing a detection of steps and change of walking direction during movement. Step detection is typically carried out by means of an accelerometer, and change of direction detection is typically carried out by means of a gyroscope or gyrometer. Such a dead reckoning is compatible with indoor implementations, especially in that it does not require the use of magnetic sensors. The reconstructed trajectory is thereby constituted of a succession of rectilinear segments, where each end of a segment models a step and where an angle between two successive segments models a change of walking direction.

Figure 1:
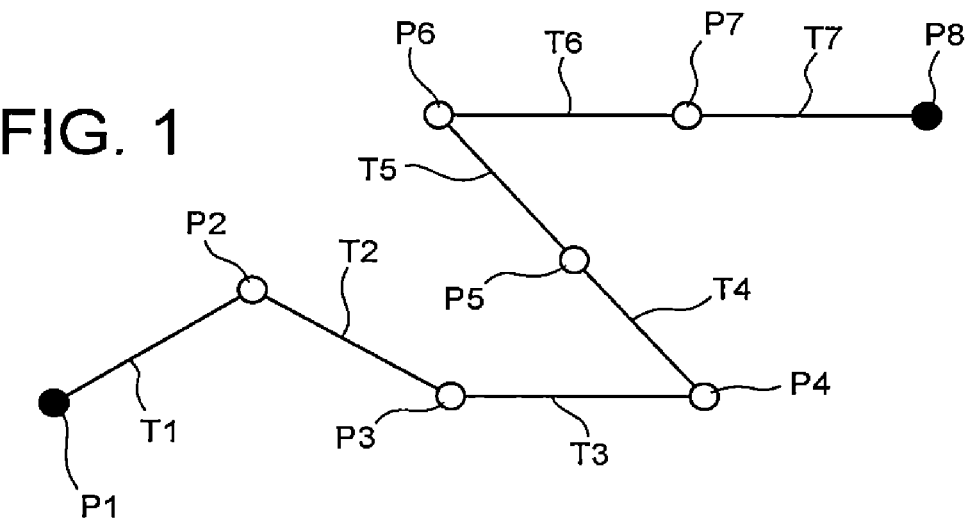
FIG. 1 is a diagram representing a reconstruction of the trajectory followed by a mobile device during a movement by means of a pedestrian dead reckoning.

In FIG. 1 is represented an example of reconstruction of a trajectory followed by a mobile device during a movement. The trajectory includes seven segments T1-T7 of which the ends P1-P8 correspond to steps taken by the user of the mobile device. A non-zero angle between two successive segments (for example between the segments T1 and T2) is representative of a change of walking direction (made at step P2 in this example). Each of the steps is time stamped, with $t_{sj}$ the instant where the step s of a user j is detected.

The invention extends to other trajectory reconstruction methods, such as "ranging", which is a technique enabling robots to detect obstacles in the environment by means of sensors (cameras, LIDAR, SONAR, etc.) with which they are equipped. If the positions of obstacles are known, the robot can plot its whole trajectory (movement and change of direction).

The invention aims to position the trajectories thereby reconstructed with respect to each other by transforming them in a common frame of reference. To do so, the invention exploits the fact that despite their independence, the trajectories are linked to each other by the location of the access terminals in the frame of reference of each trajectory.

The method according to the invention includes to this end a step of calculating, for each mobile device, the locations of access terminals in a frame of reference linked to the mobile device. These locations are more precisely calculated, in a manner known per se, from the measurements of the indicator carried out by the mobile device, these measurements making it possible to estimate the distances between the terminals and the mobile device. The measured indicator may for example be the round-trip time (RTT), the time difference of arrival (TDoA), the angle of arrival (AoA), or the received signal strength indicator (RSSI).

This calculation of the locations of the access terminals in a frame of reference linked to a mobile device may be carried out by the device itself, and the locations thereby calculated may be collected by a server. Alternatively, the measurements of the indicator carried out by a mobile device are directly collected by a server, this server calculates the locations of the access terminals from the collected measurements.

While it is moving, the mobile device detects access terminals and carries out, for each of the access terminals, measurements of the indicator of which the value varies for example approximately according to the inverse of the distance separating the mobile device (at the instant of carrying out the measurement) from the access terminal corresponding to the measurement. Knowing the instants of carrying out the measurements of the indicator ($t_{kj}$ being the instant where the k-th measurement is carried out by the user j), and the reconstructed trajectory (with $t_{sj}$ the instant where the step s of a user j is detected and ($\bar{x}_{sj}$, $\bar{y}_{sj}$) the location of the step s estimated by the trajectory reconstruction in a frame of reference linked to the user), it is possible to determine the location of the carrying out of each of the measurements on the trajectory. For example, when $t_{s-1j} < t_{kj} \leq t_{sj}$, the location ($x_{kj}$, $y_{kj}$) of the carrying out of the k-th measurement of the user j is expressed according to:

$$\begin{cases} x_{kj} = \bar{x}_{sj} - \Delta t_{ksj}(\bar{x}_{sj} - \bar{x}_{s-1j}) \\ y_{kj} = \bar{y}_{sj} - \Delta t_{ksj}(\bar{y}_{sj} - \bar{y}_{s-1j}) \end{cases}, \text{ with } \Delta t_{ksj} = \frac{t_{sj} - t_{kj}}{t_{sj} - t_{s-1j}}.$$

Then, knowing the measurements of the indicator and their locations ($x_{kj}$, $y_{kj}$), it is possible to determine the locations of the access terminals in a frame of reference linked to the mobile device.

The aforementioned server next carries out a transformation of the different trajectories in a common frame of reference. More specifically, the server implements a step of determining, for each mobile device, a geometric transformation that transforms the locations of the terminals in the frame of reference linked to the mobile device into locations transformed in a common frame of reference. This determination is carried out so as to superimpose according to a superimposition validity metric, for each terminal, the locations of the terminal transformed in the common frame of reference with a location of the terminal in the common frame of reference.

This determination typically implements a procrustean analysis to identify the geometric transformation which, when it is applied to the point cloud constituted of the locations of the terminals in a frame of reference linked to a mobile device, makes it possible to make the transformed cloud coincide with the point cloud constituted of the locations of the terminals in the common frame of reference.

This geometric transformation may be expressed as a linear transformation (translation, rotation, symmetry and homothety) of the points of a matrix $A_j$ so that they are superimposed in an optimal manner on the points of a matrix $A_{ref}$. It may be written according to $A_{ref} = A_j R_{jref} T_{jref}$, where $R_{jref}$ and $T_{jref}$ are respectively the matrix of rotation/symmetry and the matrix of translation translating the geometric transformation of the points of $A_j$ so that they coincide with those of $A_{ref}$ according to the superimposition validity metric. Within the scope of the invention, $A_j$ is the matrix of the locations of N terminals in the frame of reference associated with the mobile device j defined as $$A_j = \begin{bmatrix} x_{1j} & y_{1j} \\ x_{2j} & y_{2j} \\ \vdots & \vdots \\ x_{Nj} & y_{Nj} \end{bmatrix}$$

and $A_{ref}$ is the matrix of the locations of the terminals in the common frame of reference defined as $$A_{ref} = \begin{bmatrix} x_{1ref} & y_{1ref} \\ x_{2ref} & y_{2ref} \\ \vdots & \vdots \\ x_{Nref} & y_{Nref} \end{bmatrix}.$$

For known $A_{ref}$ and $A_j$, the matrices $R_{jref}$ and $T_{jref}$ may be constructed from the deletion of translation, rotation and symmetry components in the data of the matrices $A_{ref}$ and $A_j$.

The metric used is typically a distance between the transformed cloud and the reference cloud. For example, the transformation is sought that minimises the sum of the squares of the differences between the location of a terminal transformed in the common frame of reference and the location of the terminal in the common frame of reference.

Figure 2:
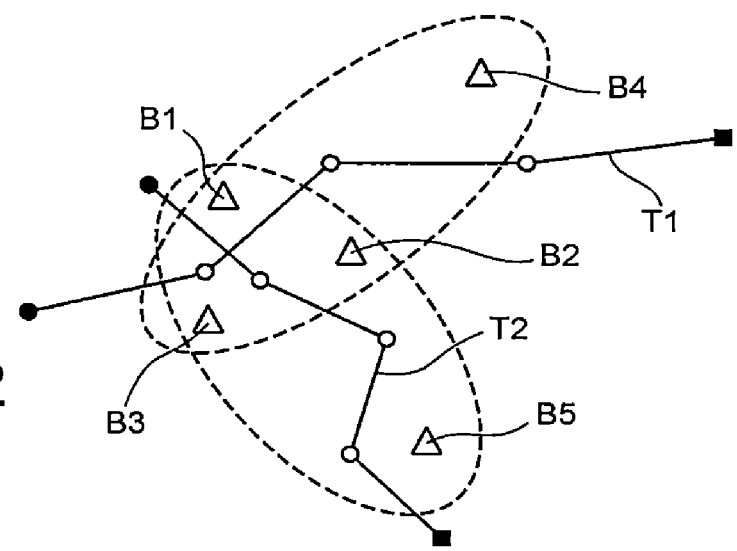
FIG. 2 is a diagram illustrating a selection of the access terminals with a view to carrying out a procrustean analysis.

This step of determining the matrices $R_{jref}$ and $T_{iref}$ may be preceded by a step of selecting the access terminals consisting in only retaining terminals of which the uncertainty of location in each of the frames of reference linked to a mobile device is below a threshold. In FIG. 2, which illustrates this selection, the estimation of the location of the terminal B5 from for example RSSI measurements carried out along the trajectory T1 is insufficiently precise because the user is always far from the terminal. The same is true of the location of the terminal B4 for the trajectory T2. In such a situation, the terminals B1, B2, B3 are selected to perform the procrustean analysis. Once the trajectories have been transformed in the common frame of reference, the terminals B4, B5 may be positioned therein. It may be noted that this approach enables the trajectories to have the information of location of non-detectable terminals (as could be for example the terminal B4 for the trajectory T2).

In a first embodiment, the common frame of reference is an absolute frame of reference based for example on knowledge of the absolute position of a terminal or an absolute position of a user (for example his initial position at the entrance of a building).

In a second embodiment, the common frame of reference is one of the frames of reference linked to the mobile devices. It is possible to select this common frame of reference in a random manner. Alternatively, it is possible to select the frame of reference associated with the trajectory for which the measurements of the indicator (and from there the calculation of the locations of the terminals in this frame of reference) are the least uncertain. The position (0,0) of this common frame of reference is for example defined by one of the steps of the corresponding trajectory. The transformation associated with the selected frame of reference is then the identity transformation.

Figure 3:
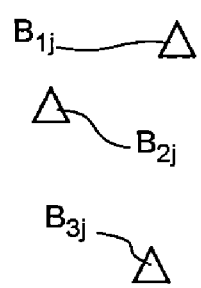
FIG. 3 is a diagram illustrating a procrustean transformation making it possible to make a point cloud constituted of the locations of the terminals in a frame of reference linked to a mobile device coincide with a point cloud constituted of the locations of the terminals in a reference frame of reference.
Figure 3:
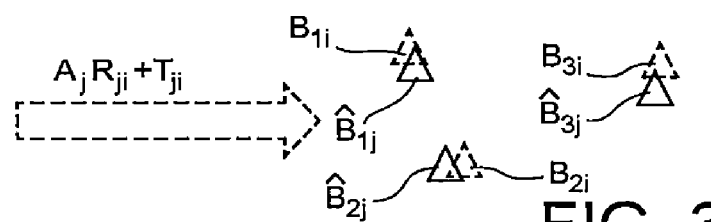

In FIG. 3 is represented a diagram illustrating the procrustean transformation making it possible to make a point cloud constituted of the locations of the terminals in a frame of reference linked to a mobile device $$A_j = \begin{bmatrix} B_{1j} \\ B_{2j} \\ B_{2j} \end{bmatrix}$$

coincide with the point cloud constituted of the locations $$A_i = \begin{bmatrix} B_{1i} \\ B_{2i} \\ B_{2i} \end{bmatrix}$$

of the terminals in a frame of reference linked to another mobile device selected as common frame of reference (i=ref). This transformation $A_j R_{ji} + T_{ji}$ transforms the locations $B_{1j}$, $B_{2j}$, $B_{3j}$ into transformed locations $\hat{B}_{1j}$, $\hat{B}_{2j}$, $\hat{B}_{3j}$ which coincide, in the least squares sense for example, with the locations of the terminals in the selected common frame of reference $B_{1i}$, $B_{2i}$, $B_{3i}$.

It may be noted from FIG. 3 that the transformed locations $\hat{B}_{1j}$, $\hat{B}_{2j}$, $\hat{B}_{3j}$ do not coincide perfectly with the locations of the terminals in the selected common frame of reference $B_{1i}$, $B_{2i}$, $B_{3i}$. Thus, in a third embodiment, the common frame of reference is constructed by transformation in a reference frame of reference and correction of the position of the terminals in the reference frame of reference. To do so, a reference frame of reference is firstly selected, for example among the frames of reference linked to the mobile devices. Then, for each mobile device, a first geometric transformation is determined that transforms the locations of the terminals in the frame of reference linked to the mobile device into locations transformed in the reference frame of reference. This determination is carried out so as to superimpose according to the superimposition validity metric, for each terminal, the locations of the terminal transformed in the reference frame of reference with the location of the terminal in the reference frame of reference. These two steps make it possible to end up with the situation represented in FIG. 3.

This third embodiment next includes the determination, for each terminal, of the location of the access terminal in the common frame of reference as a function of the locations transformed in the reference frame of reference. The location of each terminal is thereby replaced by a corrected location. Taking the example of the terminal n° 1, the locations transformed in the reference frame of reference $B_{1i}$, $\hat{B}_{1j}$ are exploited to calculate a location of the access terminal in the common frame of reference $B_{1ref}$. The corrected location corresponds for example to the average or to the median of the locations transformed in the reference frame of reference. The median proves to be more robust than the average to possible aberrant locations of the terminals. It is also possible to calculate a weighted average. The weight associated with each location transformed in the reference frame of reference corresponds for example to an uncertainty associated with this location (for example an uncertainty on the x-axis and an uncertainty on the y-axis).

Once this common frame of reference has been constructed (knowledge of the locations $B_{nref}$ of the terminals), geometric transformations are determined as described previously making it possible to bring closer the locations of the terminals in the frames of reference of the trajectories with the locations of the terminals in the common frame of reference.

Then, in one or the other of the embodiments described previously, once the geometric transformations to the common frame of reference have been determined (for each device i the transformation matrices in the common frame of reference $R_{iref}$ and $T_{iref}$ are known), for each mobile device, the trajectory of the mobile device is modified by applying to it the corresponding geometric transformation. Thus $\tilde{U}_i = U_i R_{iref} + T_{iref}$ is calculated, with $\tilde{U}_i$ the matrix of the positions of the steps of the user in the frame of reference of its trajectory i, and $\tilde{U}_i$ the matrix of the positions of the steps of this same user in the common frame of reference.

When the number of steps P of a trajectory is greater than the number N of access terminals, the trajectory is chopped into successive sections each constituted of a number of points (steps) identical to the number N of access terminals. Then the corresponding geometric transformation is applied to each of the sections. In other words, the matrices $U_i$ are constructed of same dimension as the matrices $A_i$. And when the division of P by N comprises a remainder, a matrix $U_i$ may comprise a step repetition.

Figure 4:
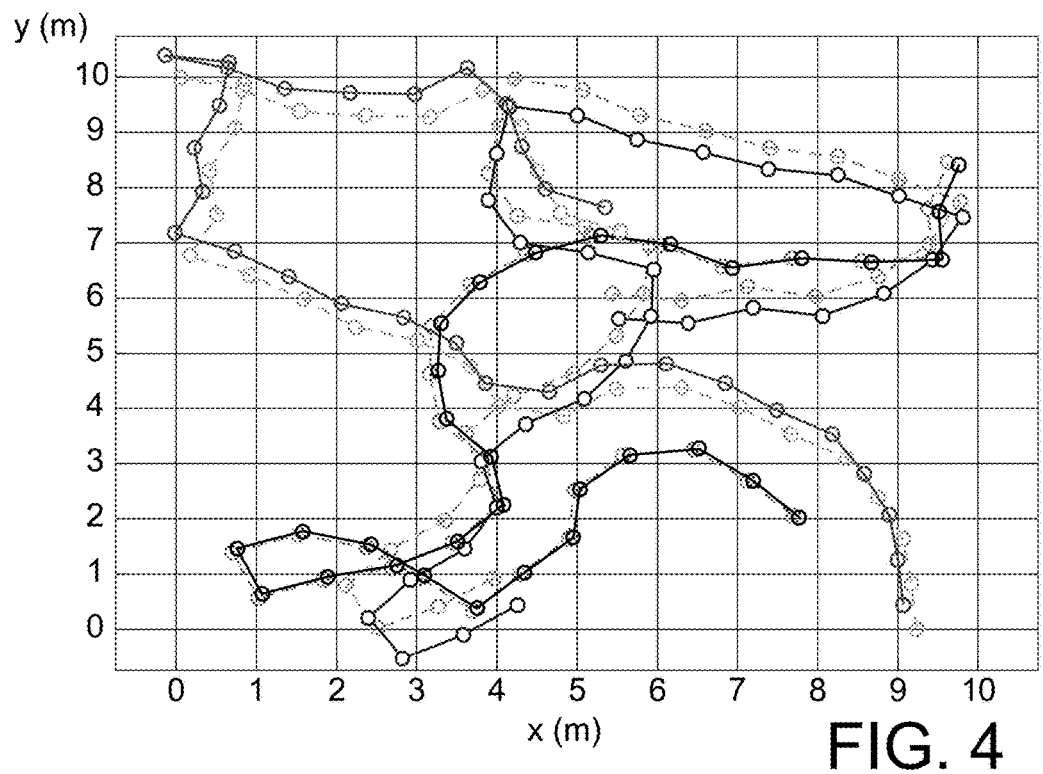
FIG. 4 is a diagram representing actual trajectories and trajectories estimated by the implementation of the method according to the invention.

FIG. 4 is a diagram representing actual trajectories (in dashed lines) and trajectories (in solid lines) estimated by the implementation of the method according to the third embodiment of the invention. More specifically, FIG. 4 shows the movement of three users in a building of 10 m×10 m dimensions. Each user takes 30 steps and the locations of three Wi-Fi terminals in each frame of reference associated with each trajectory are calculated. The estimated trajectories have been placed in the frame of reference of the actual trajectories to compare their positions with respect to each other and, thus, to be able to have an idea of the quality of the reconstruction of the trajectories. To determine the locations of the Wi-Fi terminals in the common frame of reference, the average has been used of the locations of the terminals transformed in a reference frame of reference corresponding to one of the frames of reference associated with the trajectory of a user.

The average distance between the actual steps ($x_i^{actual}$, $y_i^{actual}$) and the estimated steps ($x_i^{estimated}$, $y_i^{estimated}$) for all the trajectories, namely $$E = \frac{1}{MP}\sum_{i=1}^{MP}\sqrt{(x_i^{actual} - x_i^{estimated})^2 + (y_i^{actual} - y_i^{estimated})^2},$$

with M the number of trajectories and P the number of steps per trajectory, is 0.3388 meters in the instance of FIG. 4.

The implementation of the third embodiment statistically reduces the error E defined above. The instance considered here comprises 10 users who move about freely in a building of 20 m×20 m dimensions. Each user makes a total of 30 steps and 10 Wi-Fi terminals are positioned randomly in the building. To arrive at this conclusion, the median of the positions is here used to correct the positions of the Wi-Fi terminals in an absolute frame of reference. Out of a total of 267 simulations, in approximately 78.3% of cases, the error E is less than that calculated without the correction of positions of the terminals (first embodiment).

Figure 5A:
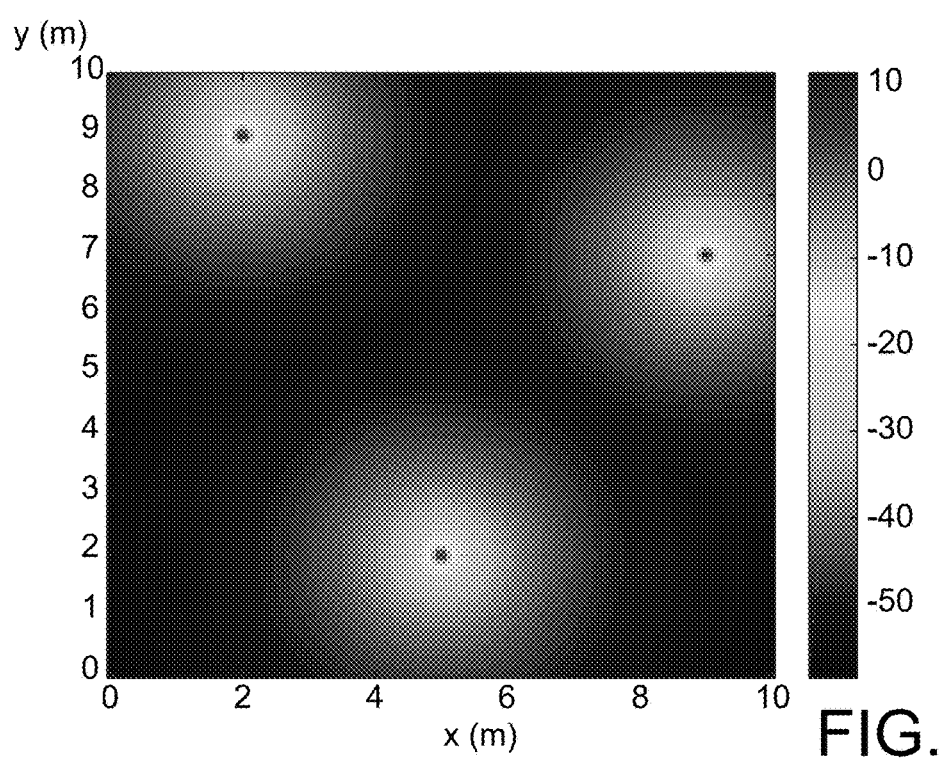
FIGS. 5a, 5b and 5c represent respectively a RSSI mapping actually generated by three Wi-Fi terminals in a building, the RSSI measurements made by three mobile devices moving about in the building and located therein by the implementation of the method according to the invention and a RSSI mapping estimated by interpolation of the RSSI measurements.
Figure 5B:
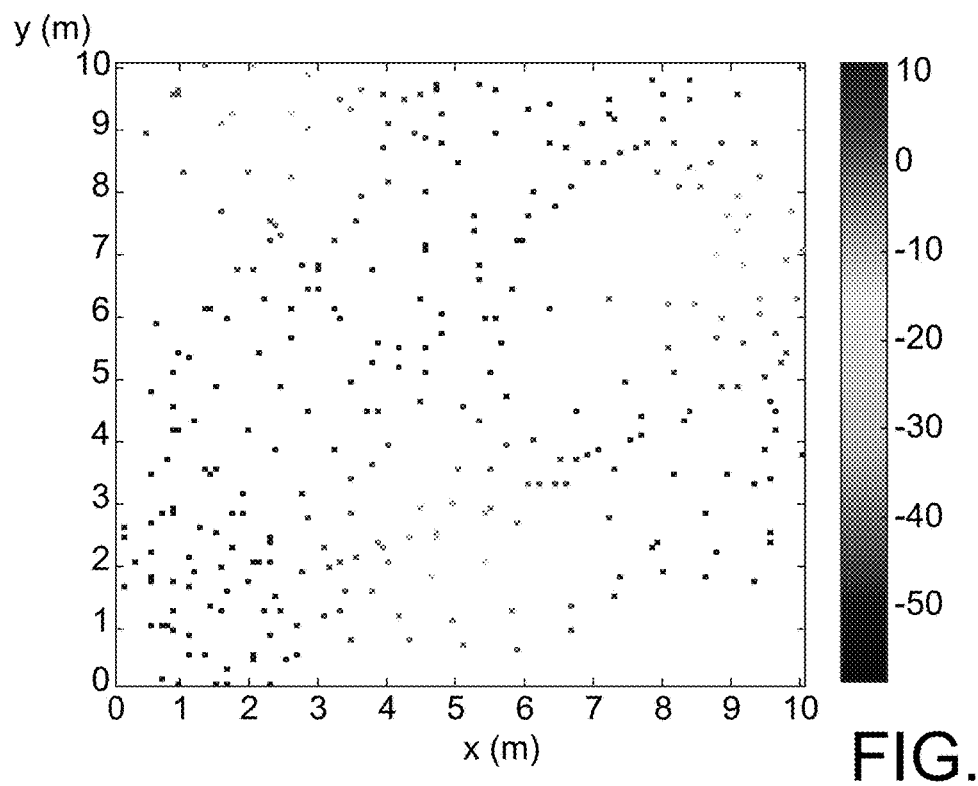
Figure 5C:
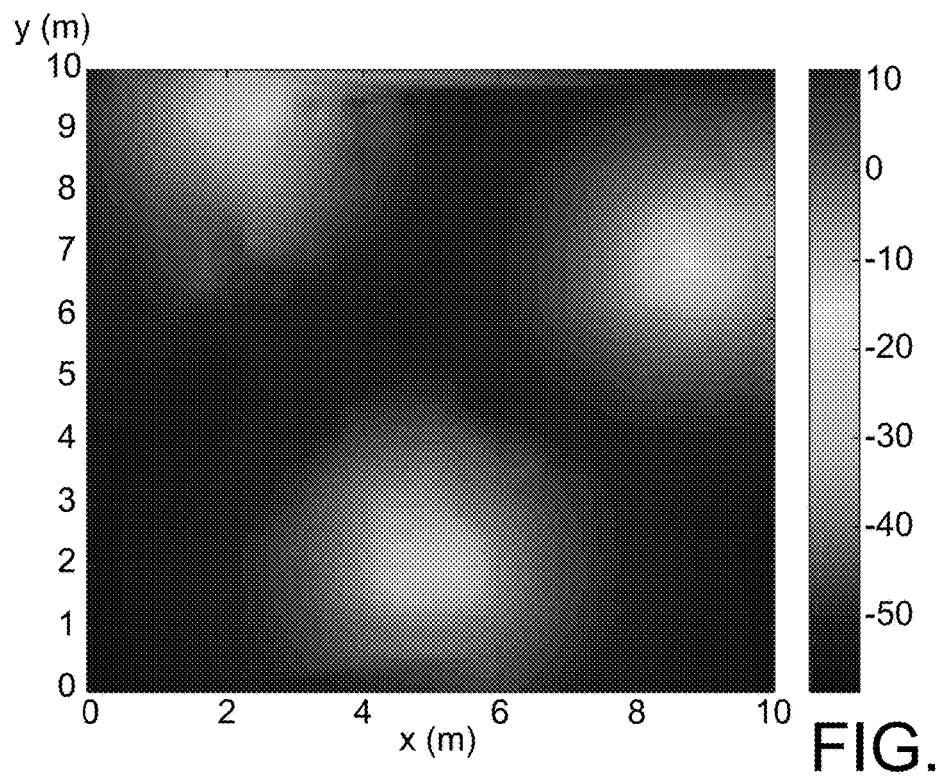

The transformation of the trajectories in the reference frame of reference makes it possible to construct a radio map (for example a RSSI map) from the points of the measurements of the different users along their trajectories. It is assumed that the instants of carrying out the measurements are known. This makes it possible to determine where these measurements have been carried out in the frame of reference linked to each respective trajectory then to determine the locations of carrying out the measurements in the reference frame of reference. For example, three users are considered as moving about freely in a building of 10 m×10 m dimensions with three Wi-Fi terminals. Each user makes a total of 100 steps and, along his trajectory, 100 RSSI measurements have been collected (for example by a server). FIG. 5a represents the RSSI mapping actually generated by the Wi-Fi terminals. FIG. 5b represents the RSSI measurements made by the users, located in the building by the implementation of the method according to the invention. FIG. 5c represents for its part a reconstruction of the RSSI mapping carried out by interpolation of the RSSI measurements of FIG. 5b. It may be noted that the interpolated RSSI map of FIG. 5c is similar to the actual RSSI map of FIG. 5a. The average quadratic error between these two maps (out of a total of 16384 points) is around 2.15 meters, for an average RSSI value of around −57 dBm for the measurements.

Possible applications of the invention are the following. As discussed above, it is possible to construct radio mappings of the environment. Hence, a RSSI measurement carried out for a new user arriving in the environment makes it possible to locate said user.

It is also possible to determine the location inside a building of a new user arriving in the building from other users already located, for example according to the following procedure. At least one Wi-Fi terminal detects the new user through a radio communication channel. A server collects the detection information of the new user. The data of the users (Wi-Fi+navigation system) are transmitted by the server to the new user. The RSSI of this new user may be compared with the RSSI data known from other users and an estimation of his position is thereby possible.

It is also possible to carry out the mapping of a building by positioning the trajectories of the users in an absolute frame of reference linked to the building then by demarcating regions where the users move about (for example corridors).

The invention is not limited to the method as described previously, but also extends to a data processing device, such as the aforementioned server including a processor configured to implement the steps of determining (for each mobile device of the geometric transformation to the common frame of reference) and modifying (for each mobile device of the corresponding trajectory by application of the corresponding geometric transformation) of this method. And the invention also extends to a computer programme product including instructions which, when the programme is run by a computer, lead said computer to implement the determining and modifying steps of this method.

The invention claimed is:

1. A method for locating mobile devices, including the following steps:
for each mobile device, reconstructing a trajectory modelling a movement made by the mobile device during which the mobile device carries out measurements of an indicator related to the distance separating it from access terminals to a communication network;
for each mobile device, calculating, from the measurements carried out by the mobile device, locations of the access terminals in a frame of reference associated to the mobile device;
determining, for each mobile device, a geometric transformation that transforms the locations of the access terminals in the frame of reference associated to the mobile device into locations transformed in a common frame of reference, said determining being carried out so as to superimpose according to a superimposition validity metric, for each access terminal, the locations of the access terminal transformed in the common frame of reference with a location of the access terminal in the common frame of reference;
for each mobile device, modifying the trajectory of the mobile device by applying the corresponding geometric transformation.

2. The method according to claim 1, wherein the common frame of reference is one of the frames of reference associated to the mobile devices.

3. The method according to claim 1, wherein the step of determining, for each mobile device, a geometric transformation is preceded by the following steps:
selecting a reference frame of reference among the frames of reference associated to the mobile devices;
determining, for each mobile device, a first geometric transformation that transforms the locations of the access terminals in the frame of reference associated to the mobile device into locations transformed in the reference frame of reference, said determination being carried out so as to superimpose according to the superimposition validity metric, for each access terminal, the locations of the access terminal transformed in the reference frame of reference with the location of the access terminal in the reference frame of reference;
for each access terminal, determining the location of the access terminal in the common frame of reference as a function of the locations transformed in the reference frame of reference.

4. The method according to claim 3, wherein, for each access terminal, the location of the access terminal in the common frame of reference is determined by the calculation of a weighted average or the median of the locations transformed in the reference frame of reference.

5. The method according to claim 4, wherein the weighting applied to each of the locations transformed in the reference frame of reference in the calculation of the weighted average is an uncertainty concerning the corresponding location in the frame of reference associated to the mobile device.

6. The method according to claim 1, wherein modifying, for each mobile device, the trajectory of the mobile device includes chopping the trajectory into successive sections each constituted of a number of points identical to the number of access terminals, and the application of the corresponding geometric transformation to each of the sections.

7. The method according to claim 1, wherein reconstructing the trajectory followed by the mobile device includes a pedestrian dead reckoning implementing a detection of steps and change of walking direction during the movement.

8. The method according to claim 1, wherein the superimposition validity metric is an indicator representative of the distance, for each access terminal, between each of the locations transformed in the reference frame of reference and the location of the access terminal in the reference frame of reference.

9. The method according to claim 1, wherein determining, for each mobile device, the geometric transformation is carried out by a procrustean analysis.

10. The method according to claim 1, further including a step of locating, in the reference frame of reference, measurements of a received signal strength indicator carried out by the mobile devices during their movements, and a step of interpolating said measurements to carry out a mapping of the received signal strength.

11. A non-transitory computer program including instructions which, when the program is executed on computer, lead said computer to implement the determining and modifying steps of the method according to claim 1.

12. A data processing device including a processor configured to implement the determining and modifying steps of the method according to claim 1.

* * * * *